(12) United States Patent
Bingle

(10) Patent No.: US 9,561,748 B2
(45) Date of Patent: Feb. 7, 2017

(54) CENTER HIGH-MOUNT BRAKE LIGHT SYSTEM

(75) Inventor: Robert Bingle, Walker, MI (US)

(73) Assignee: ADAC PLASTICS, INC., Grand Rapids, MI (US)

( * ) Notice: Subject to any disclaimer, the term of this patent is extended or adjusted under 35 U.S.C. 154(b) by 747 days.

(21) Appl. No.: 13/981,521

(22) PCT Filed: Jan. 26, 2012

(86) PCT No.: PCT/US2012/022771
§ 371 (c)(1),
(2), (4) Date: Feb. 23, 2015

(87) PCT Pub. No.: WO2012/103366
PCT Pub. Date: Aug. 2, 2012

(65) Prior Publication Data
US 2015/0158418 A1    Jun. 11, 2015

Related U.S. Application Data

(60) Provisional application No. 61/436,400, filed on Jan. 26, 2011.

(51) Int. Cl.
*B60Q 1/44* (2006.01)
*B60Q 1/30* (2006.01)

(52) U.S. Cl.
CPC .............. *B60Q 1/444* (2013.01); *B60Q 1/302* (2013.01)

(58) Field of Classification Search
CPC ......... B60Q 3/023; B60Q 1/2665; B60Q 1/06; B60Q 1/22; B60Q 1/2661; B60Q 1/503; B60Q 1/54; B60Q 2300/312; B60Q 2300/41; B60Q 2300/42; B60Q 1/323; B60Q 3/004; B60Q 2300/054; B60Q 2300/3321

(Continued)

(56) References Cited

U.S. PATENT DOCUMENTS 5,182,796 A * 1/1993 Shibayama .......... G03G 15/502
    399/81
5,400,225 A * 3/1995 Currie .................. B60Q 1/0011
    340/468

(Continued)

FOREIGN PATENT DOCUMENTS

| CN | 101482243 | 7/2009 |
| JP | H09109772 | 4/1997 |

OTHER PUBLICATIONS

International Search Report, Sep. 21, 2012, for PCT/US2012/022771.

*Primary Examiner* — Daniel Previl
(74) *Attorney, Agent, or Firm* — Dickinson Wright PLLC

(57) ABSTRACT

A center high-mount brake-light system for a motor vehicle, comprising a plurality of selectively-illuminatable lights arranged to define each of a center section comprising at least one of the plurality of lights, and at least two outer sections disposed on either side of the center section. A controller is operative to selectively illuminate the plurality of lights of the center and at least two outer sections in response to changes in the rate of travel of the vehicle and/or actuation of the vehicle's brakes, and whereby the plurality of lights are characterized by at least the following illumination states:
(a) an illumination state in which the lights of each of the center and at least two outer sections are illuminated in their entireties in response to actuation of the vehicle's brakes;
(b) an illumination state in which illumination of the lights of each of the at least two outer sections ceases or diminishes perceptibly relative to illumination of the center section after a predetermined period of time following actuation of the vehicle's brakes if there has been less than a predetermined amount of vehicle deceleration; and (Continued)

(c) an illumination state in which increasing numbers of the plurality of lights of each of the at least two outer sections are progressively illuminated in response to corresponding and progressively increasing amounts of vehicle deceleration above a predetermined threshold.

11 Claims, 4 Drawing Sheets

(58) Field of Classification Search
USPC .............. 340/479, 464, 435, 468, 903, 466, 467,340/902, 463
See application file for complete search history.

(56) References Cited

U.S. PATENT DOCUMENTS

| | | | |
|---|---|---|---|
| 5,828,319 A * | 10/1998 | Tonkin | B60Q 1/444 340/464 |
| 5,856,793 A | 1/1999 | Tonkin et al. | |
| 6,072,391 A * | 6/2000 | Suzuki | B60K 35/00 340/435 |
| 6,573,830 B2 | 6/2003 | Cohen et al. | |
| 6,753,769 B1 | 6/2004 | Elliott | |
| 7,019,632 B2 | 3/2006 | Cole | |
| 2010/0085180 A1 | 4/2010 | Mathis | |

* cited by examiner

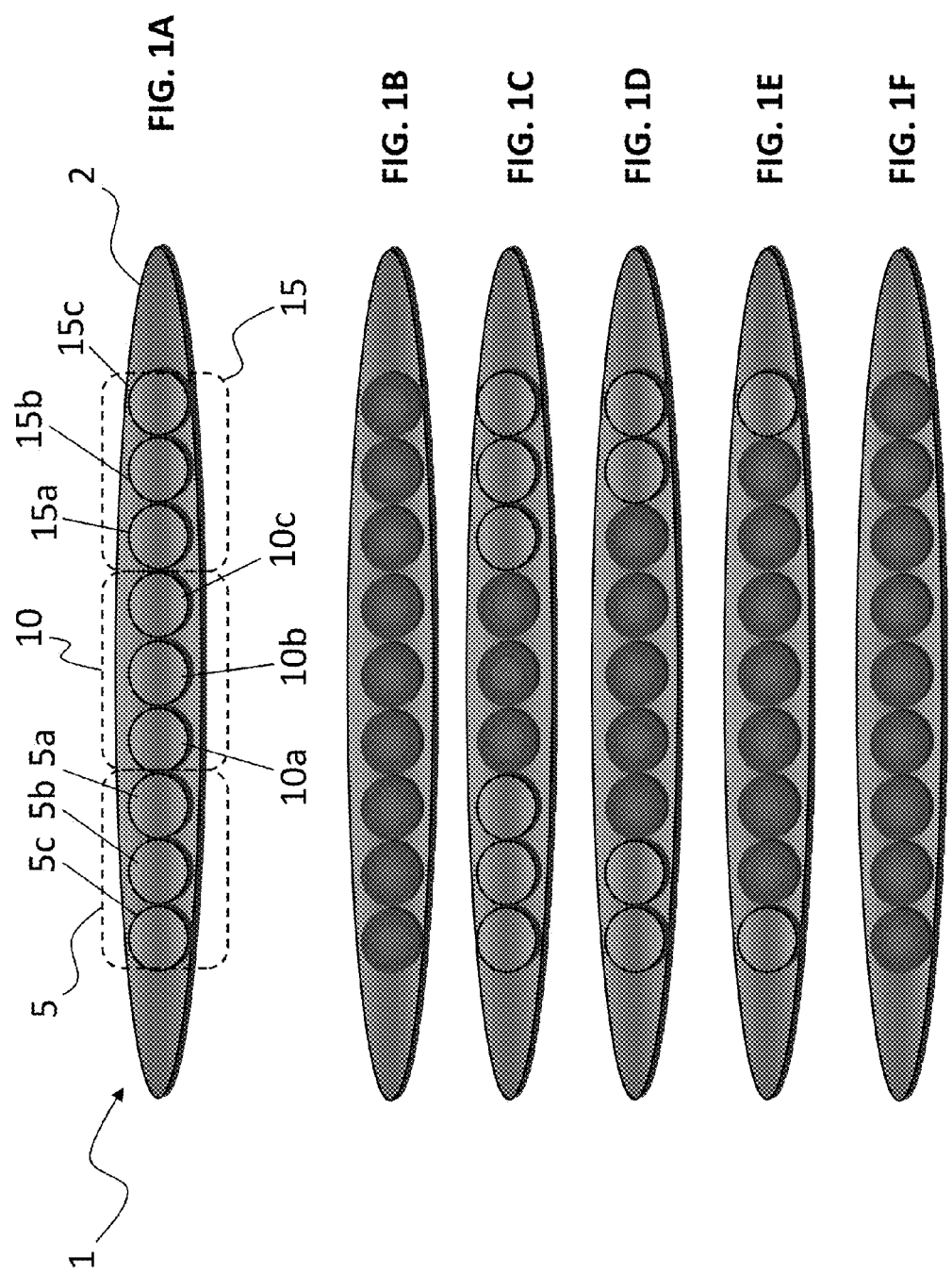

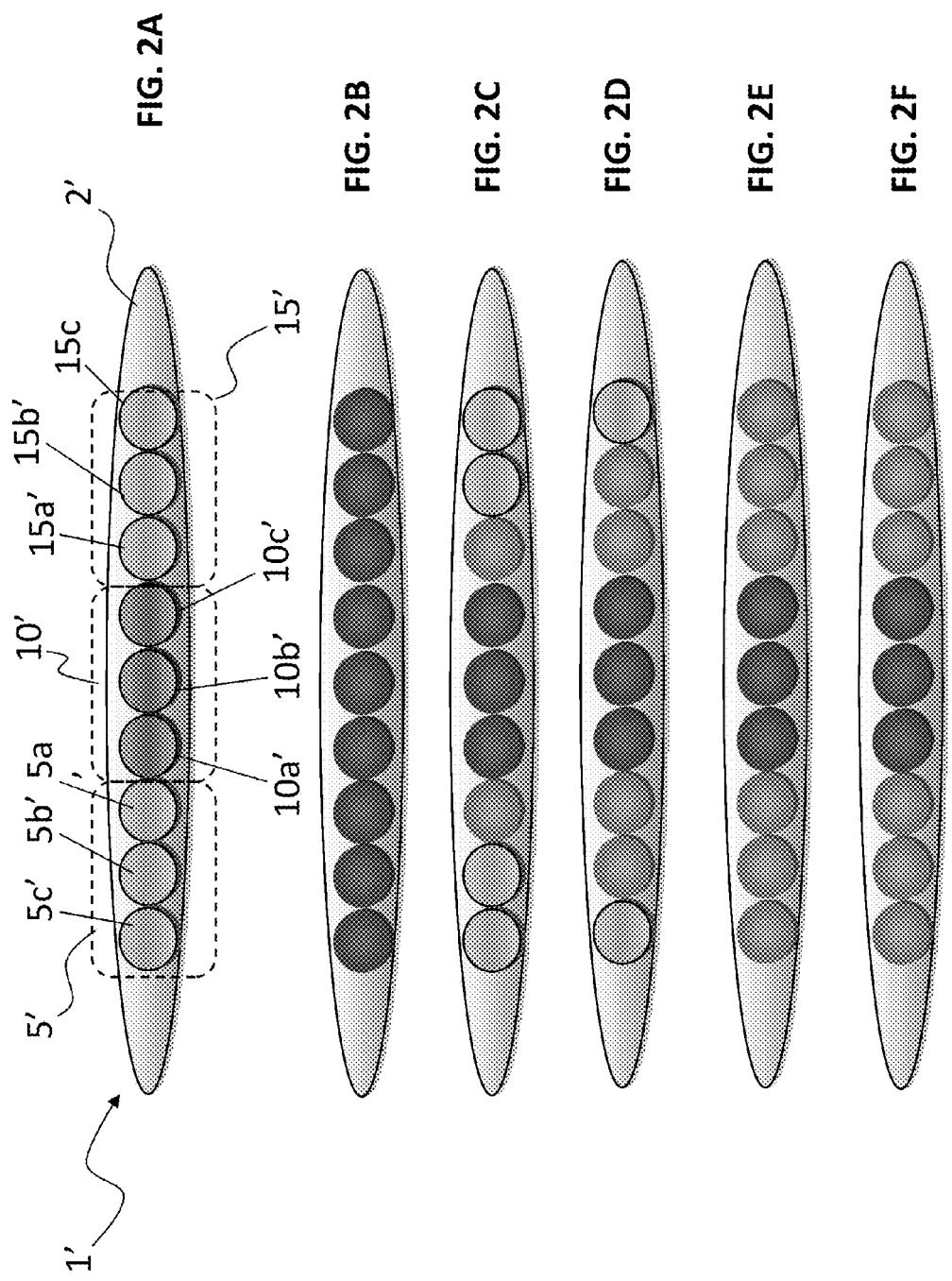

CENTER HIGH-MOUNT BRAKE LIGHT SYSTEM

CROSS REFERENCE TO RELATED APPLICATIONS

The present application is a national stage filing, pursuant to 35 U.S.C. Section 371, of International Patent Application No. PCT/US2012/022771, filed 26 Jan. 2012, and through which priority is claimed to U.S. Provisional Patent Application Ser. No. 61/436,400, filed 26 Jan. 2011, the disclosures of which are incorporated herein by reference in their entireties.

FIELD OF THE INVENTION

The present invention pertains to a center high-mount brake-light system for a motor vehicle, and more particularly to such a brake-light system comprising a plurality of lights that are selectively-illuminatable in response to changes in the rate of travel of the vehicle and/or actuation of the vehicle's brakes.

BACKGROUND

Center high-mount ("CHM") brake lights originally were developed to provide increased indication to a trailing vehicle of deceleration by a leading vehicle, thus allowing more reaction time for the trailing vehicle to also decelerate. And while CHM brake lights successfully augment the warning provided to trailing vehicles, the warning is not always sufficient. For instance, in high traffic areas and congested highways during rush hours it is common for the brake lights of a leading vehicle to be on for extended periods of time due to the "bumper to bumper" traffic. In these "traffic jam" conditions, brake lights begin to have less effectiveness as drivers of trailing vehicles drive with their brake pedals depressed in anticipation of deceleration or stopping by vehicle in front of them. In these circumstances, the brake lights are fully and continuously illuminated. Thus, the drivers of trailing vehicles may not receive adequate warning that one or more leading vehicles are decelerating or stopping.

Several and varied solutions to the foregoing problem have been proposed. For instance, Elliott, U.S. Pat. No. 6,753,769, discloses a progressive slow-stop signaling system for energizing a plurality of linearly-arranged yellow and red lights mounted on the rear of a vehicle. The yellow lights are progressively energized from left to right as the vehicle's accelerator is progressively released, while the red lights are progressively energized from left to right as the vehicle's brake pedal is depressed. Salsman, U.S. Pat. No. 5,089,805, discloses a brake light system to indicate the intensity of slow down in a moving vehicle. In particular, the system comprises an array of lights which are sequentially activated by an inertia switch, with more lights being activated as the rate of deceleration increases. Finally, Mathis, US Published Application No. 2010/0085180, discloses a deceleration brake light system comprising a plurality of lights arranged in an array comprising a plurality of vertical columns and horizontal rows. When the brakes of the vehicle are depressed, these lights illuminate progressively from both outermost ends of the array towards the middle.

While the foregoing systems improve upon conventional three-light (i.e., left, right and CHM) brake-light systems, it is envisioned by the inventor hereof that even more informative brake-light systems would help reduce accidents between leading and trailing vehicles.

SUMMARY

The present invention comprehends a center high-mount brake-light system for a motor vehicle, comprising: a plurality of selectively-illuminatable lights arranged to define each of a center section comprising at least one of the plurality of lights, and at least two outer sections disposed on either side of the center section; and a controller operative to selectively illuminate the plurality of lights of the center and at least two outer sections in response to changes in the rate of travel of the vehicle and/or actuation of the vehicle's brakes. The plurality of lights are characterized by at least the following illumination states:

(a) an illumination state in which the lights of each of the center and at least two outer sections are illuminated in their entireties in response to actuation of the vehicle's brakes;

(b) an illumination state in which illumination of the lights of each of the at least two outer sections ceases or diminishes perceptibly relative to illumination of the at least one light of the center section after a predetermined period of time following actuation of the vehicle's brakes if there has been less than a predetermined amount of vehicle deceleration; and (c) an illumination state in which increasing numbers of the plurality of lights of each of the at least two outer sections are progressively illuminated in response to corresponding and progressively increasing amounts of vehicle deceleration above a predetermined threshold.

The plurality of selectively-illuminatable lights may be LEDs and/or incandescent bulbs.

In one embodiment, the at least one light of the center section is visually distinguishable from the lights of either of the at least two outer sections. For example, the invention in one embodiment is characterized in that the at least one light of the center section is red in color when illuminated, and the lights of the at least two outer sections are selectively illuminatable in the colors red or amber, as follows:

in the illumination state in which the lights of each of the center and at least two outer sections are illuminated in their entireties in response to actuation of the vehicle's brakes, the lights of the center and at least two outer sections are red; and in the illumination state in which increasing numbers of the plurality of lights of each of the at least two outer sections are progressively illuminated in response to corresponding and progressively increasing amounts of vehicle deceleration above a predetermined threshold, the at least one light of the center section is red and the lights of the at least two outer sections are amber.

According to one feature of the present invention, the number of lights in each of the at least two outer sections is equal.

Per another feature, the invention is characterized in that, in the illumination state (c), increasing numbers of the plurality of lights of each of the at least two outer sections are illuminated progressively outwardly away from the center section in response to corresponding and progressively increasing amounts of vehicle deceleration above a predetermined threshold.

Per still another feature, the plurality of selectively-illuminatable lights are arranged to define each of a center section and three or more outer sections disposed so as to radiate outwardly from the center section.

In one embodiment of the present invention, the center section is defined by one selectively-illuminatable light, and each of the at least two outer sections are defined by a plurality of lights.

The present invention may, in one embodiment, comprise a decelerometer. Per this embodiment, the controller is operative to selectively illuminate the plurality of lights of the center and at least two outer sections in response to changes in the rate of travel of the vehicle as determined by the controller using information from the decelerometer.

Alternatively, or in addition, controller may be operative to selectively illuminate the plurality of lights of the center and at least two outer sections in response to changes in the rate of travel of the vehicle as determined by information from the vehicle respecting the degree of actuation of the vehicle's brake pedal.

Alternatively, or in addition, the controller may be operative to selectively illuminate the plurality of lights of the center and at least two outer sections in response to changes in the rate of travel of the vehicle as determined by information from the vehicle respecting changes in the vehicle's rate of travel.

BRIEF DESCRIPTION OF THE DRAWINGS

For a better understanding of the invention, and to show more clearly how it may be carried into effect according to one or more embodiments thereof, reference will now be made, by way of example, to the accompanying drawings, showing exemplary embodiments of the present invention and in which:

FIGS. 1A through 1F depict in the various illumination states thereof the CHM brake-light system according to the first embodiment of the present invention;

FIGS. 2A through 2F depict in the various illumination states thereof an exemplary CHM brake-light system according to a second embodiment of the present invention.

WRITTEN DESCRIPTION

As required, a detailed embodiment of the present invention are disclosed herein. However, it is to be understood that the disclosed embodiment is merely exemplary of the invention that may be embodied in various and alternative forms. Therefore, specific structural and functional details disclosed herein are not to be interpreted as limiting, but merely as a representative basis for teaching one skilled in the art to variously employ the present invention.

The accompanying drawings are not necessarily to scale, and some features may be exaggerated or minimized to show details of particular components.

Figure 1:
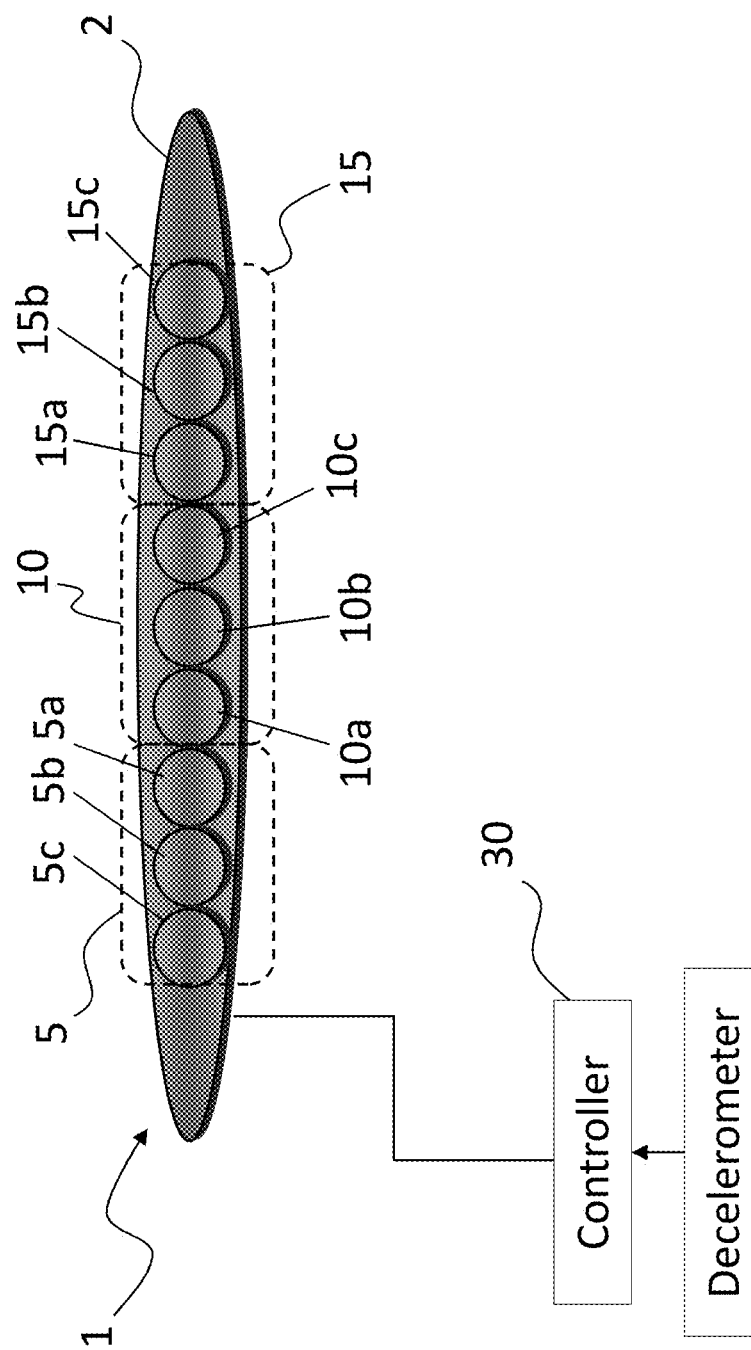
FIG. 1 depicts an exemplary CHM brake-light system according to a first embodiment of the present invention.

Referring now to the drawings, wherein like numerals refer to like or corresponding parts throughout the several views, the present invention is generally characterized as a center high-mount brake-light system 1 for a motor vehicle, the system comprising a plurality of selectively-illuminatable lights arranged to define each of a center section 10 and at least two outer sections 5, 15 disposed on either side of the center section. FIG. 1A (in which none of the plurality of lights are shown as being illuminated). A controller (30 in FIG. 1) is operative to selectively illuminate the plurality of lights of the center 10 and at least two outer sections 5, 15 in response to changes in the rate of travel of the vehicle and/or actuation of the vehicle's brakes, whereby the plurality of lights are characterized by at least the following illumination states:

(a) an illumination state in which each of the center 10 and at least two outer sections 5, 15 are illuminated in their entireties in response to actuation of the vehicle's brakes (FIG. 1B);

(b) an illumination state in which illumination of each of the at least two outer sections 5, 15 ceases or diminishes perceptibly relative to illumination of the center section after a predetermined period of time following actuation of the vehicle's brakes if there has been less than a predetermined amount of vehicle deceleration (FIG. 1C); and (c) an illumination state in which increasing numbers of the plurality of lights of each of the at least two outer sections are progressively illuminated in response to corresponding and progressively increasing amounts of vehicle deceleration above a predetermined threshold (FIGS. 1D through 1F).

Preferably, though not necessarily, at least the center section of lights is visually distinguishable from the lights of either of the at least two outer sections. For example, but without limitation, FIGS. 2A through 2F depict an embodiment of the present invention wherein the plurality of lights 10a'-10c' of center section 10' are red in color, whereas the plurality of lights 5a'-5c' and 15a'-15c' of outer sections 5' and 15', respectively, are capable of both amber and red colored illumination. More particularly, lights 5a'-5c' and 15a'-15c' of outer sections 5' and 15' are comprised of each of red and amber colored lights, so that in the illumination state in which each of the center 10' and at least two outer sections 5', 15' are illuminated in their entireties in response to actuation of the vehicle's brakes (FIG. 2B), all of the lights of each section 5, 10 and 15 are red in color; whereas, in each of the illumination state in which illumination of each of the at least two outer sections 5, 15 ceases after a predetermined period of time following actuation of the vehicle's brakes if there has been less than a predetermined amount of vehicle deceleration (FIG. 2C), and the illumination state in which increasing numbers of the plurality of lights 5a'-5c', 15a'-15c' of each of the at least two outer sections 5', 15', respectively, are progressively illuminated in response to corresponding and progressively increasing amounts of vehicle deceleration above a predetermined threshold (FIGS. 2D through 2F), the lights of the outer sections 5 and 15 are amber in color.

In the embodiment of FIGS. 1A through 1F, by contrast, all of the plurality of lights of each of the center 10 and two outer sections 5, 15 are depicted as being red in color when illuminated.

With continuing reference to FIGS. 1A through 1F, the CHM brake-light system 1 of a first illustrated embodiment will be seen to comprise a plurality of lights equally divided among the center section 10 (comprising the plurality of lights 10a, 10b, 10c), outer section 5 (comprising the lights 5a, 5b, 5c), and outer section 15 (comprising the lights 15a, 15b, 15c). As noted above, each of the lights 5a-5c, 10a-10c and 15a-15c are all red in color when illuminated, so that the demarcation between each of the center 10 and outer sections 5, 15 is defined only by the numbers of lights in each section (three per section, according to the illustrated embodiment, though greater or fewer numbers of lights per section could be employed). While the number of lights in each section 5, 10, 15 is the same in the illustrated embodiment, this need not be the case, as noted below in respect of the embodiment of FIG. 3 (although preferably, though not absolutely, the number of lights in at least outer sections 5 and 15 will be equal).

Figure 3:
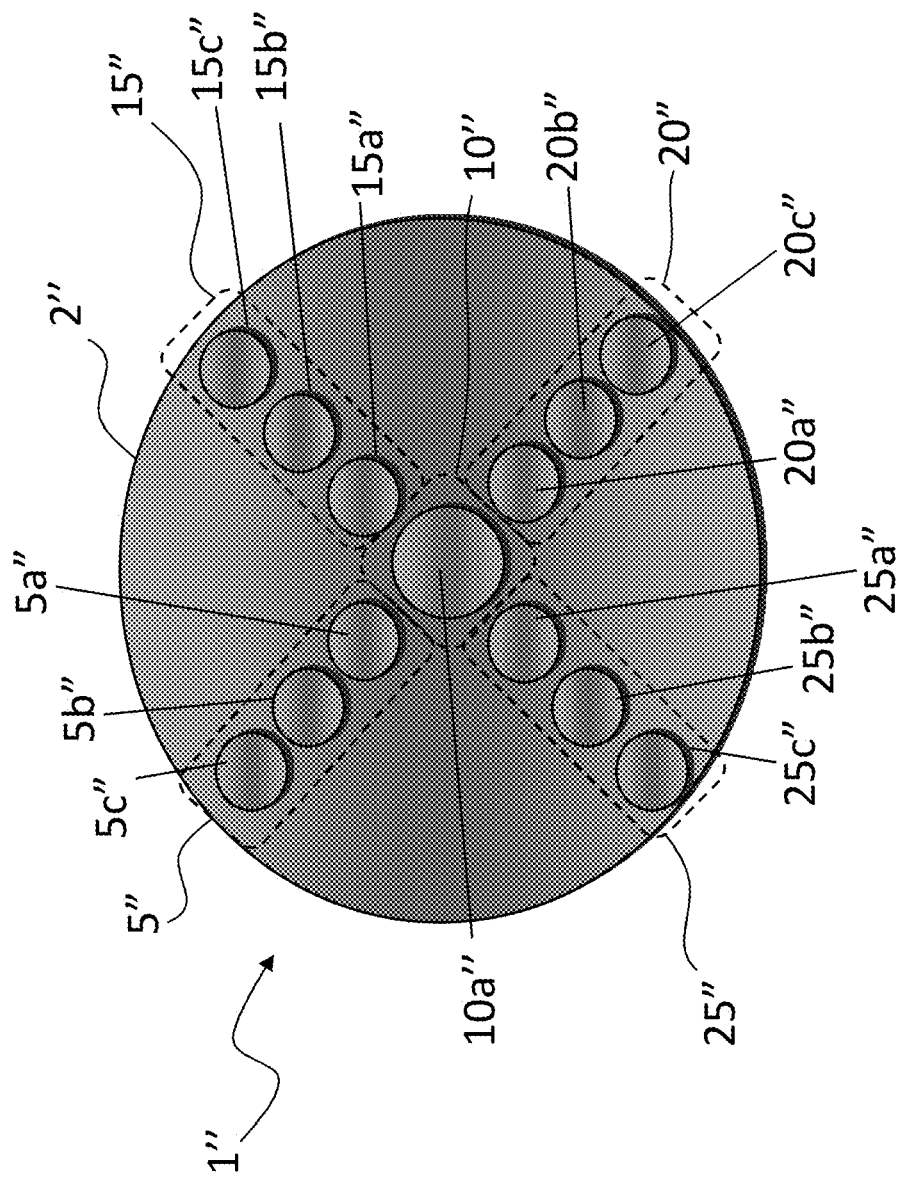
FIG. 3 depicts a third embodiment of the present invention.

As depicted, two outer sections 5 and 15 of lights flank center light section 10 in a linear array. However, it will be appreciated that other arrangements are possible, including, by way of non-limiting example, more than two outer sections arranged so as to radiate outwardly from a center section in a star, cross, or similar pattern. One such exemplary embodiment is shown in FIG. 3, according to which four outer sections 5", 15", 20" and 25" radiate outwardly from the center section 10". Each of the outer sections is, as shown, comprised of three lights, 5a"-5c", "15a"-15c", 20a"-20c" an 25a"-25c". In contrast, the center section 10" may optionally (whether in the embodiment of FIG. 3 or other embodiments disclosed herein) comprise only a single light 10a", as depicted. Of course, other geometries are also possible, subject only to the principles of operation of the inventive system as herein described.

While, in the drawings, each of the plurality of lights comprising the center and outer sections are clearly shown for purposes of explaining the present invention, it will be understood that a CHM brake-light system according to the preset invention may be constructed so that the one or more individual lights of each section are not separately perceptible to a viewer (e.g., a trailing vehicle). For example, and without limitation, a CHM brake-light system according to the present invention may be constructed so that the plurality of lights comprising the center and outer sections are not directly visible to a viewer but, instead, their light upon selective illumination travels through one or more light pipes to one or more lenses through which the light is visible to a viewer. In this manner, as will be appreciated by those skilled in the art, the various illumination states of the CHM brake-light system of the present invention may be perceived as an essentially seamless light which, for instance, "grows" radially outwardly as the rate of deceleration of the vehicle increases (according to the principles of operation described elsewhere herein).

According to the illustrated embodiments, and by way of example and not limitation, center section 10, 10', 10" is by itself of sufficient surface area, color and intensity (when illuminated) to satisfy applicable standards (such as government regulations) for CHM brake-lights, thereby making the lights of outer sections 5, 5', 5", 15, 15', 15", 20", 25" supplemental. In construction, the CHM brake-light system of the present invention is essentially conventional, with the plurality of lights comprising LEDs or incandescent light bulbs disposed in a polymer (e.g., polycarbonate) housing 2, 2", 2". The lights will be powered by the vehicle's battery, per convention, while the controller 30 may be provided within or in close proximity to the CHM brake-light housing 2 (such as, for instance, forming part of a printed circuit board) or provided remotely therefrom (such as, for instance, forming part of the vehicle's master control unit, or MCU).

The rate of vehicle deceleration may be determined or derived by any conventional means, including, without limitation, an embedded decelerometer 35 (exemplified in FIG. 1) the information from which is used by the controller to determine the rate of deceleration, signal from the vehicle's body control module (BCM), the degree of brake pedal actuation (as determined by a brake pedal sensor, for instance), etc. The rate of vehicle deceleration required to effect progressive illumination of the lights of outer sections 5, 15, 5', 15' or 5", 15", 20", 25" may be user defined, and may be dependent upon such considerations as the number of lights in each outer section, user preference, etc.

With continued reference to the embodiment of FIGS. 1A through 1F (operation of the embodiment of FIGS. 2A through 3 being identical unless otherwise noted), in operation the lights of all three sections 5, 10, 15 are illuminated in their entireties when the vehicle's operator actuates the vehicle's brakes (FIG. 1B). If the driver continues to actuate the vehicle's brakes but the rate of the vehicle's deceleration is not above a predefined threshold, then after a predefined period of time the lights of the outer sections 5, 15 would cease to be illuminated or at least fade in intensity to a perceptible (to the operator of a trailing vehicle) degree relative to the lights of the center section 10 (FIG. 1C). The lights of center section 10, however, would remain illuminated for so long as the vehicle's operator continues to actuate the vehicle's brake and the vehicle's rate of deceleration remains below the predefined threshold (FIG. 1C). If, however, the vehicle's operator increases the degree of braking to thereby increase the vehicle's rate of deceleration, the lights of the outer sections 5, 15 would be progressively illuminated sequentially outwardly from the center section 10, with an increasing number of the lights in each outer section 5, 15 being illuminated in response to an increase in the vehicle's rate of deceleration, all as shown in FIGS. 1D through 1F. More specifically, when the vehicle's brakes are actuated and the rate of deceleration is above a first predefined threshold, a first light 5a, 15a of each outer section 5, 15 is illuminated (FIG. 1D). If the rate of deceleration exceeds (by a further increase in the amount of braking force) a second predefined threshold that is greater than the first threshold, a further, second light 5b, 15b of each outer section 5, 15 is illuminated to indicate to a trailing vehicle that the rate of deceleration of the leading vehicle is even greater (FIG. 1E). If the rate of deceleration exceeds (by a still further increase in the amount of braking force) a third predefined threshold that is higher than the first or second thresholds, a further, third light 5c, 15c of each outer section 5, 15 is illuminated to indicate to a trailing vehicle that the rate of deceleration of the leading vehicle is even greater (FIG. 1F).

By way of summarizing the foregoing, then, the embodiments of FIGS. 1A through 1F and 2A through 2F depict the following illumination states of the inventive CHM brake-light system:

FIGS. 1A and 2A—lights of all sections 5, 10, 15/5', 10', 15' are "off," a condition corresponding to a state in which the vehicle's brake have not been actuated.

FIGS. 1B and 2B—lights of all sections 5, 10, 15/5', 10', 15' are "on," a condition corresponding to a state in which the vehicle's brakes have been actuated.

FIGS. 1C and 2C—lights of the center section 10/10' only are "on" (or, at least, are perceptibly brighter than the lights of the outer sections), a condition corresponding to a state in which the vehicle's operator continues to actuate the brakes but the rate of deceleration is not above a predefined threshold. In other words, the brakes are actuated but the vehicle is not slowing significantly. This state corresponds to the condition commonly referred to as "riding the brakes."

FIGS. 1D and 2D—a first light 5a, 15a/5a', 15a' of each outer section 5, 15/5', 15' is "on," along with the lights of the center section 10, 10', a condition corresponding to a state in which the vehicle's brakes have been actuated and the vehicle's rate of deceleration is above a first predefined threshold.

FIGS. 1E and 2E—a further, second light 5b, 15b/5b', 15b' of each outer section 5, 15/5', 15' is "on," along with the lights of the center section 10, 10', a condition corresponding to a state in which the vehicle's brakes have been actuated and the vehicle's rate of deceleration is above a second predefined threshold that is greater than the first predefined threshold (thus representing an increase in the vehicle's rate of deceleration over the rate of deceleration that resulted in actuation of only the first lights 5a, 15a/5a', 15a' as shown in FIGS. 1D and 2D).

FIGS. 1F and 2F—a still further, third light 5c, 15c/5c', 15c' of each outer section 5, 15/5', 15' is "on," along with the lights of the center section 10, 10', a condition corresponding to a state in which the vehicle's brakes have been actuated and the vehicle's rate of deceleration is above a third predefined threshold that is greater than the first predefined threshold (thus representing an increase in the vehicle's rate of deceleration over the rate of deceleration that resulted in actuation of only the first and second lights 5a, 5b, 15a, 15b/5a', 5b', 15a', 15b' as shown in FIGS. 1E and 2E).

The foregoing description of the exemplary embodiment of the invention has been presented for purposes of illustration and description. It is not intended to be exhaustive of, or to limit, the invention to the precise form disclosed, and modification and variations are possible in light of the above teachings or may be acquired from practice of the invention. The embodiment shown and described in order to explain the principles of the invention and its practical application to enable one skilled in the art to utilize the invention in various embodiments and with various modifications as are suited to the particular application contemplated. Accordingly, all such modifications and embodiments are intended to be included within the scope of the invention. Other substitutions, modifications, changes and omissions may be made in the design, operating conditions, and arrangement of the exemplary embodiments without departing from the spirit of the present invention.

The invention in which an exclusive property or privilege is claimed is defined as follows:

1. A center high-mount brake-light system for a motor vehicle of the type including brakes, comprising:
    a plurality of selectively illuminable lights arranged to define each of a center section comprising at least one of said plurality of lights, and at least two outer sections disposed on either side of the center section; and
    a controller operative to selectively illuminate said plurality of lights of the center and at least two outer sections in response to changes in the rate of travel of the vehicle and/or actuation of the vehicle's brakes, and whereby said plurality of lights are characterized by at least the following illumination states:
    (a) an illumination state in which all of said lights of the center and at least two outer sections are illuminated in response to actuation of the vehicle's brakes;
    (b) an illumination state in which illumination of said lights of each of the at least two outer sections ceases or diminishes perceptibly relative to illumination of the at least one light of the center section after a predetermined period of time following actuation of the vehicle's brakes if there has been less than a predetermined amount of vehicle deceleration; and
    (c) an illumination state in which increasing numbers of said plurality of lights of each of the at least two outer sections are progressively illuminated in response to corresponding and progressively increasing amounts of vehicle deceleration above a predetermined threshold.

2. The center high-mount brake-light system of claim 1, wherein further said at least one light of the center section is visually distinguishable from said lights of either of the at least two outer sections.

3. The center high-mount brake-light system of claim 1, wherein said at least one light of the center section is red in color when illuminated, and said lights of the at least two outer sections are selectively illuminable in the colors red or amber, as follows:
    in the illumination state in which all of said lights of each of the center and at least two outer sections are illuminated in response to actuation of the vehicle's brakes, the lights of the center and at least two outer sections are red; and
    in the illumination state in which increasing numbers of said plurality of lights of each of the at least two outer sections are progressively illuminated in response to corresponding and progressively increasing amounts of vehicle deceleration above a predetermined threshold, said at least one light of the center section is red and said lights of the at least two outer sections are amber.

4. The center high-mount brake-light system of claim 1, wherein the number of said lights in each of the at least two outer sections is equal.

5. The center high-mount brake-light system of claim 1, wherein, in the illumination state (c), increasing numbers of said plurality of lights of each of the at least two outer sections are illuminated progressively outwardly away from the center section in response to corresponding and progressively increasing amounts of vehicle deceleration above a predetermined threshold.

6. The center high-mount brake-light system of claim 1, wherein said plurality of selectively illuminable lights are arranged to define each of a center section and three or more outer sections disposed so as to radiate outwardly from the center section.

7. The center high-mount brake-light system of claim 1, wherein the center section is defined by one selectively illuminable light, and each of the at least two outer sections are defined by two or more of said plurality of lights.

8. The center high-mount brake-light system of claim 1, wherein said plurality of selectively illuminable lights are LEDs and/or incandescent bulbs.

9. The center high-mount brake-light system of claim 1, further comprising a decelerometer, and wherein the controller is operative to selectively illuminate said plurality of lights of the center and at least two outer sections in response to changes in the rate of travel of the vehicle as determined by the controller using information from the decelerometer.

10. The center high-mount brake-light system of claim 1, wherein the controller is operative to selectively illuminate said plurality of lights of the center and at least two outer sections in response to changes in the rate of travel of the vehicle as determined by information from the vehicle respecting the degree of actuation of the vehicle's brake pedal.

11. The center high-mount brake-light system of claim 1, wherein the controller is operative to selectively illuminate said plurality of lights of the center and at least two outer sections in response to changes in the rate of travel of the vehicle as determined by information from the vehicle respecting changes in the vehicle's rate of travel.

* * * * *